(12) United States Patent
Becker (10) Patent No.: US 11,618,307 B2
(45) Date of Patent: Apr. 4, 2023

(54) LATCH ASSEMBLY FOR TONNEAU COVER

(71) Applicant: Extang Corporation, Ann Arbor, MI (US)

(72) Inventor: Anthony E. Becker, Saline, MI (US)

(73) Assignee: EXTANG CORPORATION

( * ) Notice: Subject to any disclaimer, the term of this patent is extended or adjusted under 35 U.S.C. 154(b) by 347 days.

(21) Appl. No.: 16/774,483

(22) Filed: Jan. 28, 2020

(65) Prior Publication Data

US 2021/0229538 A1 Jul. 29, 2021

(51) Int. Cl.
*B60J 7/19* (2006.01)
*E05C 1/14* (2006.01)
*E05C 1/00* (2006.01)

(52) U.S. Cl.
CPC .............. *B60J 7/198* (2013.01); *E05C 1/006* (2013.01); *E05C 1/14* (2013.01)

(58) Field of Classification Search
CPC ... E05C 1/006; E05C 1/14; E05C 1/12; E05C 1/00; B60J 7/198; Y10S 292/37; Y10S 292/63; Y10S 292/32; Y10S 292/33; E05B 13/10
USPC .................................................. 292/28, 157
See application file for complete search history.

(56) References Cited

U.S. PATENT DOCUMENTS

| 2,839,912 | A | * | 6/1958 | Corbin | E05B 83/16 292/216 |
| 4,210,361 | A | | 7/1980 | Marvin et al. | |
| 5,350,213 | A | | 9/1994 | Bernardo | |
| 7,040,675 | B1 | * | 5/2006 | Ott | E05B 47/023 292/DIG. 43 |
| 7,204,527 | B2 | * | 4/2007 | Geurden | E05B 79/20 292/28 |
| 7,261,328 | B2 | | 8/2007 | Minix | |
| 7,363,786 | B2 | * | 4/2008 | TerHaar | E05B 83/16 292/216 |
| 9,827,839 | B2 | | 11/2017 | Williamson et al. | |
| 2002/0178771 | A1 | * | 12/2002 | Porter | E05C 9/046 70/257 |
| 2005/0029832 | A1 | | 2/2005 | Verduci et al. | |
| 2006/0082161 | A1 | * | 4/2006 | Minix | E05B 13/10 292/28 |
| 2015/0008680 | A1 | * | 1/2015 | Suzuki | E05B 83/30 292/32 |
| 2017/0259654 | A1 | | 9/2017 | McDonald, II et al. | |
| 2018/0340360 | A1 | * | 11/2018 | Nakasone | E05B 83/30 |
| 2019/0040663 | A1 | * | 2/2019 | Ruzich | B60R 7/04 |

(Continued)

FOREIGN PATENT DOCUMENTS

WO    WO-2017058829 A1 *  4/2017   ............... B60R 7/04

OTHER PUBLICATIONS

Canadian Office Action dated Dec. 2, 2021 for CA Application No. 3,096,617.

*Primary Examiner* — Christine M Mills
*Assistant Examiner* — James E Ignaczewski
(74) *Attorney, Agent, or Firm* — The Dobrusin Law Firm, P.C.

(57) ABSTRACT

A latch assembly for a tonneau cover. The latch assembly includes a button and a slider. The slider is movably coupled to the button. Movement of the button in a first direction causes the slider to move in an unlatching direction. Movement of the button in a second direction causes the slider to move in a latching direction.

20 Claims, 6 Drawing Sheets

(56) References Cited

U.S. PATENT DOCUMENTS

| | | | |
|---|---|---|---|
| 2019/0061499 A1* | 2/2019 | McDonald, II | E05C 9/043 |
| 2019/0161997 A1* | 5/2019 | Dworkin | B65F 1/1615 |

\* cited by examiner

LATCH ASSEMBLY FOR TONNEAU COVER

FIELD

These teachings relate to a tonneau cover, and more particularly to a latch assembly for opening and closing a tonneau cover.

BACKGROUND

Some vehicles, like pick-up trucks, have an open-topped bed or cargo area that may be used for storing or transporting cargo. A cover, such as a tonneau cover, may be placed over the cargo area. The cover may be opened to access the cargo and/or the inside of the cargo area and closed to conceal the cargo from view and/or to prevent fluid and/or debris from entering the cargo area.

Some covers have latch assemblies for opening and closing the cover; however, many of these are not intuitive to operate. For example, to open some covers, some covers require an operator to pull down on a handle with one hand while pushing up on the cover with the other hand. Other covers require an operator to twist a handle with one hand while pushing up on the cover with the other hand. These simultaneous, opposing movements may be awkward for an operator, especially for an operator who is unfamiliar with the cover and/or for an operator who does not have two free hands to operate or manipulate the cover.

Many latch assemblies comprise a numerosity of constituent components and/or a complexity of component constructions. As a result, producing these latch assemblies and/or tonneau covers comprising these latch assemblies involve higher costs associated with raw materials, forming, machining, and factory assembly.

Accordingly, it may be desirable to have an improved tonneau cover and/or latch assembly that that overcomes at least some of the aforementioned challenges.

SUMMARY

These teachings are directed to a latch assembly for removably securing a tonneau cover to a truck bed comprising: (a) a button and (b) a slider movably coupled to the button; wherein moving the button causes the slider to move in an unlatching direction.

The latch assembly comprises a housing that at least partially encloses the button and the slider; wherein the housing directs the movement of the button along a first axis via a first channel; and wherein the housing directs the movement of the slider along a second axis via a second channel, a housing track, a housing engaging guide, or any combination thereof.

The button comprises a shoulder upon which the slider is movably coupled via a complementary fit between a shoulder track and a shoulder engaging guide.

The first channel accepts a central portion of the button and the second channel accepts the shoulder and the slider; wherein the first axis is proximal to the first channel and the second axis is proximal to the second channel; and wherein the first axis is orthogonal to the second axis.

The button and the slider have a movable relationship along a third axis. The third axis is oriented at an angle, other than a right angle, with respect to the first axis and the second axis.

The slider is movably coupled to the housing via a complementary fit between a housing track and a housing engaging guide. There are at least two housing tracks and at least two housing guides located on opposing or opposing sides of the slider. The housing or the slider comprises slots configured to accept the housing engaging guide and orient the housing engaging guide in line with the housing track.

The latch assembly comprises a biasing member located between the housing and the button, which is movable with respect to the housing; and wherein the biasing member biases the button along the first axis. The button, the housing, or both includes a retaining hole that accepts the biasing member. The housing comprises a first section and a second section, which are removably coupled together. The latch assembly includes more than one shoulder and more than one slider; wherein for every one of the shoulders there is a corresponding slider; and wherein the shoulders are located on opposing sides of the button. The slider comprises one of: (a) a direct latching interface or (b) an indirect latching interface; wherein the indirect latching interface is configured to engage a link and the link is configured to engage the latch engagement feature; and wherein the direct latching interface is configured contact a latch engagement feature.

These teachings are directed to a tonneau cover comprising the latch assembly as described herein, wherein the latch assembly is configured to selectively unlatch a cover with respect to a tonneau cover assembly.

These teachings are directed to a method of operating the tonneau cover comprising the latch assembly including the steps of: (a) moving the button proximally, with respect to the housing, along the first axis, (b) engaging the slider with a shoulder of the button, (c) moving the slider along a third axis, and (d) moving the slider proximal, with respect to the housing, along the second axis.

These teachings are directed to a latch assembly for removably securing a tonneau cover to a truck bed comprising: (a) a housing, (b) a button comprising a shoulder, and (c) a slider engaging the shoulder; wherein the button is movable along a first axis and the slider is movable along a second axis; wherein the shoulder and the slider are movable, with respect to each other, along a third axis; and wherein biasing the button along the first axis causes the slider to move along the second axis and move, with respect to the shoulder, along the third axis.

The button is configured to be moved in an unlatching direction by a user and the button is biased in a latching direction by a biasing member.

The button is configured to transmit a force, exerted by the user or the biasing member, to the slider via the shoulder; and wherein a reciprocal force is exerted by the slider against the shoulder and the reciprocal force is bifurcated into a first component, which is perpendicular to the shoulder, and a second component, which is oriented along the third axis; and wherein movement of the slider corresponds to the second component.

The housing comprises a first channel, which directs the movement of the button along a first axis; wherein the housing comprises a housing track, a housing engaging guide, or any combination thereof, which directs the movement of the slider along a second axis.

DETAILED DESCRIPTION

The vehicle may be any vehicle that has a cargo area. The cargo area may be any area or portion of the vehicle used for storing or transporting goods and/or cargo. The cargo area may be a cargo box, a bed, a trunk, or any combination thereof. The cargo area may be any part of the vehicle that has an open top that can be at least partially closed or covered by a cover, which may be a trunk, decklid, tonneau cover, cap, tent, tarp, board, or any combination thereof. The cargo area may also be a trailer that is configured to be pulled or pushed by the vehicle.

The cargo area may be defined by one or more walls, which may also be referred to as bed walls or fenders, and a tailgate. The walls may comprise a front wall, a side wall, or both. The front wall may be located adjacent the cab of the vehicle. The side walls may be located on opposing sides of the vehicle (i.e., the driver's side and the passenger's side).

The side walls may comprise an inner wall. The inner wall may be oriented toward the interior of the cargo area. The opposing inner walls may be facing each other.

The walls may comprise a top surface. The top surface may be located on a side of the cargo area and/or adjacent to a side of the cargo area that is opposing the floor of the cargo area.

The tonneau cover may be any cover that is located on top of a cargo area. The tonneau cover may be a tonneau cover. The tonneau cover may function to protect against dirt, debris, fluid, other contaminants, or any combination thereof from entering an inside of the cargo area. The tonneau cover may function to conceal the inside of the cargo area and/or contents inside the cargo area. The cover may also be a trunk, decklid, cap, tent, tarp, board, or any combination thereof. The cover may also be a truck cap or tent that functions to increase a height of a cargo area.

The tonneau cover may comprise one or more of panels, one or more rails, or both. The panels may be moved or repositioned relative to one another and/or relative to the cargo area to move the tonneau cover between an open configuration (i.e., where one or all of the panels are positioned to provide access to the cargo box) and a closed configuration (i.e., where the panels are positioned to cover the cargo box).

The one or more panels may be configured to be rolled-up into a closed configuration and unrolled into the open configuration. The one or more panels may be configured to be folded-up into an open configuration and then unfolded into the closed configuration. In some configurations, the tonneau cover may be a single panel cover. The single panel may be raised or pivoted relative to the walls or top surfaces of the cargo area and/or tailgate to move the tonneau cover from the closed configuration to the open configuration, and then lowered or pivoted downwards to the closed configuration.

One or more of the panels may be substantially rigid. One or more of the panels may be substantially flexible but stabilized with a rigid frame. The tonneau cover may be a canvas, fabric, a folded, or roll-up type tonneau cover.

The rails may function to support the panels. The panels may form a contacting relationship with the rails. The rails may be removably fixed to the cargo area of the vehicle. The rails may be removably fixed to a front wall, a side wall, an inner wall, a top surface, a tailgate, or any combination thereof. The rails may situate at least partially above the top surface, situate flush with the top surface, or situate below the top surface.

The vehicle, the tonneau cover, or both may include one or more latch assemblies. A latch assembly may be used latch or unlatch the tonneau cover, open and close the tonneau cover, lock or unlock the tonneau cover, or any combination thereof. The latch assembly includes one or more features or elements that cooperate with the tonneau cover, rails, and/or bed walls to latch, unlatch, lock, unlock, open, close the tonneau cover, or any combination thereof.

The latch assembly may be located on or at least partially inside the tonneau cover or one or more panels thereof. The latch assembly may be located on a bottom side and/or on a topside of the tonneau cover or one or more panels thereof. The latch assembly may be located at any portion of the tonneau cover, as long as the latch can be accessed by a user standing outside of the cargo area of the vehicle. The latch assembly may be located or attached to a rear-most panel, located closest to the tailgate.

The latch assembly or one or more elements thereof may be located inside one or more panels of the tonneau cover. For example, the latch assembly or one or more elements thereof may be located between a top outside surface of the tonneau cover or panel. As another example, the latch assembly may be located on a bottom outside surface of the tonneau cover or panel. As another example, the latch assembly may be located within one or more panels of the tonneau cover and a button of the latch assembly may be exposed and extend from a bottom surface of the panels (i.e., a latch assembly that is located partially inside the tonneau cover).

The latch assembly may be generally centered along a center longitudinal axis of the vehicle and/or cargo area or the latch assembly may be offset, with respect to the center longitudinal axis of the vehicle and/or cargo area, towards either the driver side or passenger side of the vehicle.

In some configurations, the latch assembly may be located or attached to the tailgate, the walls, or any combination thereof. In such configurations, the tonneau cover may comprise the latch engagement feature.

The latch assembly may include one or more buttons. The button may be moved or manipulated to actuate the latch assembly, the mechanism, one or more of the latch pins, or any combination thereof. The button may be moved manually by applying a force onto the button with one or both hands or fingers of a user. The button may be moved automatically via a motor, battery, cylinder, spring, biasing member, piston, or any combination thereof. The button may be moved remotely via electromagnetic radiation (e.g., Bluetooth enabled).

Moving or movement of the button, as used herein, means moving, biasing, pressing, pushing repositioning, or otherwise changing a position or location of the button relative to a housing, mechanism, latch pins, tonneau cover or panels thereof, floor of the cargo area, or any combination thereof. The button may be moved by the user interacting with a central portion of the button, which may be exposed from the housing. The central portion may be geometrically centered to the latch assembly, the housing, the tonneau cover, the vehicle or any combination thereof. The central portion may extend outside of the housing so that it is accessible to a user. The central portion may be accepted by a central channel of a housing, as described further herein.

The button may be moved, biased, pressed, pushed, or repositioned along a first axis. The button may be at least partially enclosed by, move within, or otherwise be directed by a first channel of the housing, along a first axis. The button may be moved upwardly or in a direction towards a bottom or inner surface of the tonneau cover or panel to unlock or open the tonneau cover. The button may be moved upwardly or in a direction away from a bottom or floor or inner surface of the cargo bed to unlock or open the tonneau cover. The button may be moved downwardly or in a direction away from a bottom or inner surface of the tonneau cover or panel to lock or close the tonneau cover. The button may be moved downwardly or in a direction toward a bottom or floor or inner surface of the cargo bed to unlock or open the tonneau cover.

The button, the housing, or both may include one or more apertures or retaining holes. The retaining hole may be an aperture, bore, opening, recess, or other feature for accommodating a biasing member or spring. IN some configurations, rather than an aperture or retaining hole, a projection, hook, or fastener may be used to engage or attach the biasing member and button.

The aperture retaining hole may function to accept, house, contain, or otherwise accommodate a biasing member. The aperture or retaining hole may be located adjacent an interface between the button and the housing so that the biasing member biases the button with respect to the housing. There may be more than one retaining hole in order to accommodate more than one biasing member. The retaining hole may be located in one or more of a variety of locations throughout the latch assembly but preferably is located along an axis, through which the button travels (i.e., the first axis), situated proximal to the first channel. Where the latch assembly comprises more than one biasing member, the biasing member and/or the retaining hole may be symmetrically dispersed, with respect to the first axis, in order to maintain smooth and even operation of the button. The aperture or retaining hole (or other feature for engaging the spring or biasing member) may also or may instead be located in one or both of the shoulders.

The latch assembly may include a biasing member. The biasing member may function to bias the button in order for the button and/or the sliders to return to a steady state position (i.e., the position occupied when the button is not being interacted with by the user). The biasing member may comprise any number of suitable articles that compress or deform to store energy and decompress or reform to release energy. Preferably the biasing member is a spring. The latch assembly, which is discussed further herein, may include one or more biasing members.

The button may include one or more recesses. The recess may function to accept, house, contain, the sliders, enable further travel of the sliders with respect to the shoulder, provide a stop or terminus of travel for the sliders, or any combination thereof. The recess may form a complementary fit with at least a portion of the slider. The sliders may positively engage with the recess when the user moves the button. The recess may be formed within the central portion of the button. There may be a corresponding recess for every one of the sliders and/or shoulders. The extent the recess extends into the button may depend on the dimensions of the mechanism or components thereof, the latch assembly or components thereof, or both. For example, latch pins extending 3 cm into latch engagement features may require the sliders to move 3 cm within the latch assembly and the shoulders may provide for 2 cm of travel while the recess provides for 1 cm of travel. As another example, reducing the profile of the shoulders may result in a shortening of the shoulder tracks but such shortening of the shoulder tracks may be offset by increasing the encroachment of the recess into the button. The button may include more than one recesses. The button may include two recesses that are on opposite or opposing sides of the button or central portion of the button.

The button may include one or more shoulders. The shoulders may function to direct the movement of the sliders, with respect to the shoulders, along a third axis; translate forces to the sliders; or both. The shoulders may extend distally from the button. The shoulders be extend laterally away from the button or central portion thereof. The shoulders may be located on opposing sides of the button. The shoulders may extend in a direction substantially in-line with the latch pins and the latch engagement features. The shoulders may be enclosed partially or entirely within the housing. The shoulders may be of a variety of shapes having at least one straight side upon which the slider travels (e.g., the shelf, as discussed below). Preferably, the shoulders comprise a profile of a right triangle with one of the legs of the triangle interfacing with the central portion of the button. The shoulders may be integrally formed with the button or the shoulders may be affixed thereto (e.g., mechanically or chemically fastened).

Each of the shoulders may comprise one or more shelf. A shelf may function to interface with the sliders. The shelf may be a flat surface so that the slider may travel or slide along the shelf.

The shelf may extend at an angle from the central axis of the button. The angle may be between 0° and 180°, between 30° and 150°, or even between 60° and 120°. The angle of the shelf may determine the length the shelf. For example, a shelf (i.e., hypotenuse) of a right triangle (i.e., shoulder) oriented 10° from the central axis will be shorter than a shelf of a right triangle oriented 45° from the central axis. The shelf may be configured to orient toward or away from the tonneau cover. The shelf may engage with the slider, as discussed further herein, when the button is moved by a user or biased by a biasing member, thereby translating forces acting upon the button into forces acting upon the slider.

The latch assembly may include one or more sliders. The sliders may function to selectively engage with the mechanism, the tonneau cover, the vehicle, or both to latch and unlatch the tonneau cover. The sliders may move, with respect to the housing, along a second axis, which may be oriented perpendicular to the first axis. The sliders may move, with respect to the button, along a third axis oriented along the shelf. The sliders may move in direct relation to the movement of the button. There may be a corresponding slider for every shoulder of the latch assembly. The sliders may interface peripheral portions of the second channel.

The shoulders or the sliders may comprise one or more shoulder tracks. A shoulder track may be a groove, notch, or other recess or cutout. The shoulder tracks may function to movably couple the slides to the shoulder and/or direct the movement of the slider, with respect to the shoulder, along a second axis, a third axis, or both. The shoulder tracks may be located adjacent to the shelves so that the sliders may interface the shelf. The shoulder tracks may accept the shoulder engaging guides. The shoulder tracks may form a complementary fit with the shoulder engaging guides. The shoulder tracks may be open on one or more ends so that the shoulder engaging guides may be easily slid into engagement with the shoulder tracks.

The shoulder tracks may extend from the central portion of the button to a distal end of the shoulder or at least partially thereof. The shoulder tracks may be molded into, affixed to, extruded, or machined into the shoulder or the slider.

The shoulders or the sliders may comprise one or more shoulder engaging guides. A shoulder engaging guide may be a projection. The shoulder engaging guides may function to engage the groove or shoulder tracks and/or direct the movement of the sliders with respect to the shoulders.

The shoulder tracks and shoulder engaging guides may comprise a variety of cross-sectional shapes. The cross-sectional shape of the shoulder tracks need not be the same as the cross-sectional shape of the shoulder engaging guides, so long as the shoulder engaging guides are able to move freely within the shoulder track. The shoulder track may be a T-shaped, U-shaped, C-shaped, mushroom shaped, or other shaped channel configure to accept a complementary shoulder engaging guide.

The shoulder tracks or the shoulder engaging guides may be located on the shoulders or the sliders. Preferably the sliders comprise the shoulder engaging guides and the shoulders comprises the housing tracks.

The shoulder tracks may include an inner lip. The inner lip may function to interface with the slider when the button is moved. The inner lip may be a surface inside of the shoulder tracks and opposing the shelf. The inner lip may extend the entire length of the shoulder tracks or at least a portion thereof. The inner lip may engage with the shoulder engaging guide, as discussed further herein, when the button is moved by a user or biased by a biasing member, thereby acting to translate forces acting upon the button into forces acting upon the slider.

The housing or the sliders may include one or more housing tracks. The housing tracks may function to movably couple the slider to the housing and direct the movement of the slider, with respect to the housing along a second axis, a third axis, or both. The housing tracks may accept the housing engaging guides. The housing tracks may form a complementary fit with the housing engaging guides. The housing tracks may be open on one or more ends so that the housing engaging guides may be easily slid into engagement with the housing tracks. The housing tracks may be present on at least one side of the housing, where the housing interfaces with a slider. Preferably the housing tracks are present on opposing sides of the housing, where the housing interfaces with a slider. There may be at least two housing tracks and corresponding housing engaging guides. The housing tracks may be open on one end so that the housing engaging guide may be easily slid into engagement with the housing tracks.

The housing tracks may be located within the second channel. The housing tracks may have a contacting relationship with the slots, discussed further herein.

The housing or the sliders may include one or more housing engaging guides. The housing engaging guides may function to direct the movement of the sliders with respect to the housing. The housing engaging guides may be oriented orthogonal to the travel path of the button.

The housing tracks or the housing engaging guides may be located on the sliders or the housing. Preferably the sliders comprise the housing engaging guides and the housing comprises the housing tracks.

The housing tracks and housing engaging guides may comprise a variety of cross-sectional shapes. The cross-sectional shape of the housing tracks need not be the same as the cross-sectional shape of the housing engaging guides, so long as the housing engaging guides are able to move freely within the housing track. Preferably, the housing track may be a rectangular channel in order to accept a complementary rectangular housing engaging guide.

The sliders may comprise a direct latching interface. The direct latching interface may function to directly contact the latch engagement feature. For example, the slider may comprise a sloped face that may be moved by the latch engagement feature when the direct latching interface contacts the latch engagement feature when the tonneau cover is closed (e.g., a slam latch); and the slider may comprise a flat face that contacts the latch engagement feature to prevent the tonneau cover from opening without moving the button, the sliders, or both. For example, the slider may move in an unlatching in reaction to a force exerted by the rail when the cover is dropped or pushed against the rail and when the slider clears the rail, the slider is free to move in a latching direction whereby the flat face moves into a position against the rail.

The sliders may comprise an indirect latching interface. The indirect latching interface may act upon a mechanism and the mechanism interacts directly with the latch engagement feature. For example, the slider may comprise a loop configured to accept a link (e.g., a cable), which engages with a mechanism, a latch pin, or both to latch and unlatch the tonneau cover.

The housing may function to house, conceal, contain, or any combination thereof, one or more elements of the latch assembly and/or mechanism. The housing may be integrally incorporated into the tonneau cover or removaby affixed thereto. The housing may be a member that is attached to the bottom surface or portion of the panel of the tonneau cover, the top surface or portion of the tonneau cover, or both. The housing may be recessed within the panel of the tonneau cover.

The housing may comprise one or more sections. The sections may function to accept the components of the latch assembly and fit together to enclose the components of the latch assembly. The sections may be removably coupled together. Preferably the housing comprises two sections, which may be partitioned in a variety of different ways. For example, the housing may be symmetrically bisected, or the housing may be asymmetrically bisected.

In one configuration where the housing is asymmetrically bisected, a first section of the housing may be referred to as an enclosure, which may receive the button, the sliders, or both. A second section of the housing may be referred to as a lid, which may at least partially cover the enclosure and secure the button, the slider, or both within the enclosure. The sections may be configured allow for the easy positioning of the button and the sliders within the housing (e.g., providing for a drop-in assembly).

In some configurations, the housing comprises one section that is configured to accept the components of the latch assembly and the section is configured to abut and affix to the tonneau cover in order to enclose the components of the latch assembly. In effect, the tonneau cover functions as the lid, as described above.

The housing may include one or more channels. The channels may function to accept one or more components of the latch assembly and/or define a path of movement for the one or more components of the latch assembly. The channels may be formed via molding, machining, extrusion, or any combination thereof. At least a portion of the channels may form an opening at a distal portion of the housing so that components of the latch assembly may be exposed from the housing and/or to allow the components to be situated within the housing. The channels may direct the movement of the button, the slider, or both.

The housing may include at least two channels. A first channel may receive the button. The button may move, along a first axis, within the first channel. The first channel may direct the movement of the button along the first axis. A second channel may receive the button, the slider or both. The sliders may move, along a second axis, within the second channel. The second channel may direct the movement along the second axis.

In some configurations, the latch assembly may be free of housing engaging guides, housing tracks, shoulder engaging guides, shoulder tracks, or any combination thereof, and the movement of the sliders may be directed by the second channel, the shoulders, or both. The second channel, the shoulders, or both may define boundaries around the sliders and restrict movement of the sliders along a second axis, a third axis, or both. Biasing members may be included in the latch assembly in order to aid the sliders return to a steady state position. For example, a biasing member may be located between a slider and the housing and bias the slider along the second axis.

The housing or the slider may include one or more slots. The slot may function to allow the slider to be dropped into the latch assembly and align the housing guide with the housing track. The slot may have a connecting relationship with the housing track. The slot may be configured to accept a housing engaging guide. The housing or the slider may include a slot for every corresponding housing engaging guide. The slots may orient the housing engaging guide in line with the housing track.

The housing may include one or more flanges. The flanges may function to interface with the tonneau cover. The flanges may extend from one or more terminal portions of the housing. The flanges may extend from opposing terminal portions of the housing. The flanges may be located on any portion of housing configured to interface with the tonneau cover. The flanges may be located on the enclosure, the lid, or both.

The flanges may include one or more openings. The openings may be configured to accept fasteners. The openings may facilitate the fastening of the latch assembly to the tonneau cover. For example, the latch assembly may be fastened to the housing via screws extending through the openings.

A force may be applied to the button. The force may function to cause the latch assembly to shift from a latched configuration to an unlatched configuration, as described further herein. The force may be applied by a user, a biasing member, a latch engagement feature, or any combination thereof.

The force may be translated to the sliders through one or more components of the latch assembly. The force may be translated to the slider via the shoulder or components thereof. A force exerted by a user may be translated to the slider via the inner lip of the shoulder, a shelf of the shoulder, or both.

The force may effectuate a reciprocal force exerted by the slider. The reciprocal force may be bifurcated into a first component and/or a second component. The first component may be perpendicular to the shoulder, the inner lip, or both. The second component may be oriented along the third axis. The movement of the slider along the third axis, with respect to the shoulder, may correspond to the second component. The movement of the slider, along the third axis, may be in an unrestricted direction (i.e., unrestricted by the confines of the housing, the shoulder, or both).

The third axis may refer to a moving relationship between the sliders and the shoulders. The third axis may refer to more than one third axis where each slider/shoulder pair has a corresponding third axis. Where the latch assembly comprises more than one slider/shoulder pair, each corresponding third axis may be oriented, in an intersecting relationship to the first axis, from 0° to 360° around the first axis. The third axes may be oriented at different angles, with respect to the first axis, from each other.

In some configurations, the movement of the slider along the third axis may be directed by the shoulder (e.g., via the tracks/guides) and movement of the slider along the second axis may be directed by the housing (e.g., via the second channel and/or the tracks/guides). The third axis may be oriented at an angle, with respect to the first axis, that is between 90° and 180°. The third axis may be oriented at an angle, with respect to the first axis that is between 0° and 90°.

In some configurations, the movement of the slider along the third axis may be directed by the housing (e.g., via the second channel and/or the tracks/guides) and the movement of the slider along the second axis may be directed by the shoulder (e.g., via the tracks/guides). The third axis may be oriented at an angle, with respect to the first axis, that is between 90° and 180°. The third axis may be oriented at an angle, with respect to the first axis that is between 0° and 90°.

The tonneau cover or the vehicle may comprise one or more latch pins. The latch pins may extend to or from a driver side, a passenger side, or both. The latch pins may be a component of the mechanism, discussed in further detail below. The latch pins may engage a latch engagement feature to close or lock the tonneau cover. The one or more latch pins may disengage a latch engagement feature to open or unlock the tonneau cover.

The latch pins may comprise an elongated member having a round oval, square, hexagon, or polygon cross-section that is configured to move upon manipulation of the button, latch assembly, mechanism, or any combination thereof.

The latch pins may be spring loaded or otherwise biased for moving the latch pins back into a steady state position after the button has been manipulated. The steady state position of the latch pin may be an extended position or retracted position.

The tonneau cover or the vehicle may comprise one or more latch engagement features. The latch engagement feature may comprise one or more openings, bores, slots, channels, pockets, depressions, catches, or other features defined or formed in one or both of the walls defining the cargo area that are configured to engage the latch pins to lock or close the tonneau cover. The latch engagement features may be located in the walls, the tailgate, the floor of the cargo area, or any combination thereof. The latch engagement features may be features that are present in the cargo area (i.e., formed by the OEM) or the latch engagement features may be added as an aftermarket modification.

The latch assembly may have a latched configuration. The latched configuration is defined by an engagement of the latch pins with the latch engagement feature. When the latch engages the latch engagement feature, the tonneau cover is secured in place. The latched configuration may be when one or more of the sliders engage any feature to restrict or prevent movement of the tonneau cover or one or more panels thereof relative to the cargo area. The latched configuration may be when one or more of the sliders are located farther away from the button than a position of the one or more sliders relative to the button when the latch assembly is in the unlatched configuration.

The latch assembly may have an unlatched configuration. The unlatched configuration is defined by a disengagement of the latch pins from the latch engagement feature. When the latch disengages the latch engagement feature, the tonneau cover is free to fold or otherwise be manipulated. The unlatched configuration may be when one or more of the sliders are not engaged with any feature that restricts or prevents movement of the tonneau cover or one or more panels thereof relative to the cargo area. The unlatched configuration may be when one or more of the sliders are located closer to the button than a position of the one or more sliders relative to the button when the latch assembly is in the latched configuration.

Latching direction may refer to movement of any component of the latch assembly, in any direction, that causes the tonneau cover to latch, lock, or both.

A latching direction of the button may refer to moving the button (i.e., the face of the button configured for interaction by a user) distally with respect to the housing. A latching direction of the sliders may refer to moving the sliders distally with respect to the housing.

Unlatching direction may refer to movement of any component of the latch assembly, in any direction, that causes the tonneau cover to unlatch, unlock, or both.

An unlatching direction of the button may refer to moving the button (i.e., the face of the button configured for interaction by a user) proximally with respect to the housing. An unlatching direction of the sliders may refer to moving the sliders proximally with respect to the housing.

The latch assembly comprises a mechanism that is configured to translate movement of the button into movement of one or more latch pins. The mechanism may include one or more links, connections, brackets, covers, biasing members, or any combination thereof. The mechanism may include a motor, battery, rotary to linear actuator (actuators that translate rotatory motion into linear motion), or any combination thereof.

The mechanism may include one or more links. A link may function to transmit force to and/or move the latch pins. The force may be a result of movement of the button, sliders, biasing members, or any combination thereof. The links may move or pull upon movement of the button, the sliders, the biasing members, or any combination thereof.

The links may be rigid members. The links may have an elongated linear or curved shape. The links may have a triangular, square, or other shape. The links may comprise cables. The cable may be a single cable or may be multiple cables braided together.

A bracket may engage one or more of the links. The bracket may function to maintain the links and/or the latch pins in an operative alignment the latch engagement feature.

Figure 1:
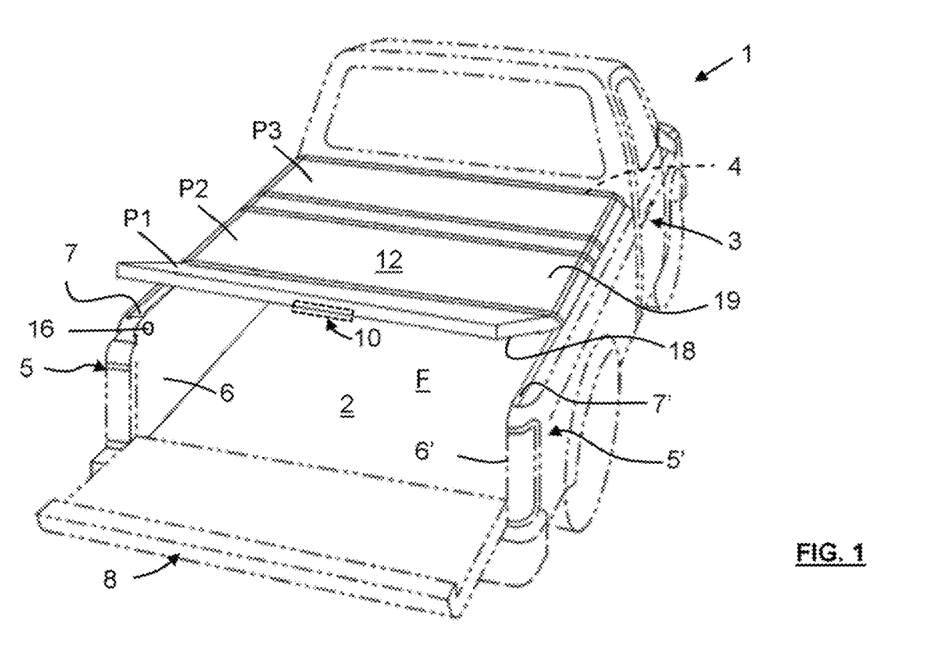
FIG. 1 is a perspective view of a vehicle.

FIG. 1 illustrates a perspective view of a vehicle 1 with a tonneau cover 12 installed on a cargo area 2 of the vehicle 1.

The cargo area 2 is defined by one or more walls that include: a front wall 4 that is located adjacent the passenger area 3; opposing side walls 5, 5'; and a tailgate 8 that opposes the front wall 4. Each side wall 5, 5' has an inner wall 6, 6' that faces an inside of the cargo area 2 and a top surface 7, 7'. One or both of the inner walls 6, 6' include a latch engagement feature 16, discussed further below.

The inside of the cargo area 2 has a bottom or floor F surrounded by the walls 4, 5, 5' and the tailgate 8. The cargo area 2 has an open top opposing the floor F that can be covered with the tonneau cover 12. The tonneau cover 12 may be attached to or supported on one or more rails or frames connected to the inner walls 6, 6' and/or attached to or supported on the top surfaces 7, 7' of the side walls 5, 5'. Additionally, or alternately, the tonneau cover 12 may be attached, connected, or supported on one or both inner surfaces or top surfaces of the front wall 4 and/or tailgate 8.

The tonneau cover 12 includes one or more panels P1, P2, P3. The tonneau cover 12 includes panels P1, P2, P3 that can be moved, folded, removed, or otherwise repositioned relative to one another and/or the cargo area 2 to move the tonneau cover 12 between an open configuration and closed configuration. The panel P1 may be referred to as the rear-most panel. The tonneau cover 12 and/or panels P1, P2, P3 include a bottom or inner surface 18 that faces the floor F of the cargo area 2. The tonneau cover 12 and/or panels P1, P2, P3 include an outer surface 19 that faces away from the floor F of the cargo area 2. In some configurations, the tonneau cover 12 may include a single panel that covers the entire cargo area 2. In some configurations, the tonneau cover 12 may be s soft or flexible construction that is configured to be rolled and unrolled into an open and closed configuration, respectively.

A latch assembly 10 is illustrated schematically in FIG. 1. The latch assembly 10 is configured to be manipulated to open and close the tonneau cover 12 and/or lock and/or unlock the tonneau cover 12. In FIG. 1, the latch assembly 10 is attached with the rear-most panel P1; however, the latch assembly 10 may be located on one or more of the panels P1, P2, P3. The latch assembly 10 may be centered between the two walls 5, 5' or the latch assembly 10 may be offset or located closer to one of the walls 5, 5'. The latch assembly 10 may be attached to the bottom or inner surface 18 of the tonneau cover 12. A housing 60 of the latch assembly 10 may be attached to the bottom or inner surface 18 of the tonneau cover 12

Figure 2:
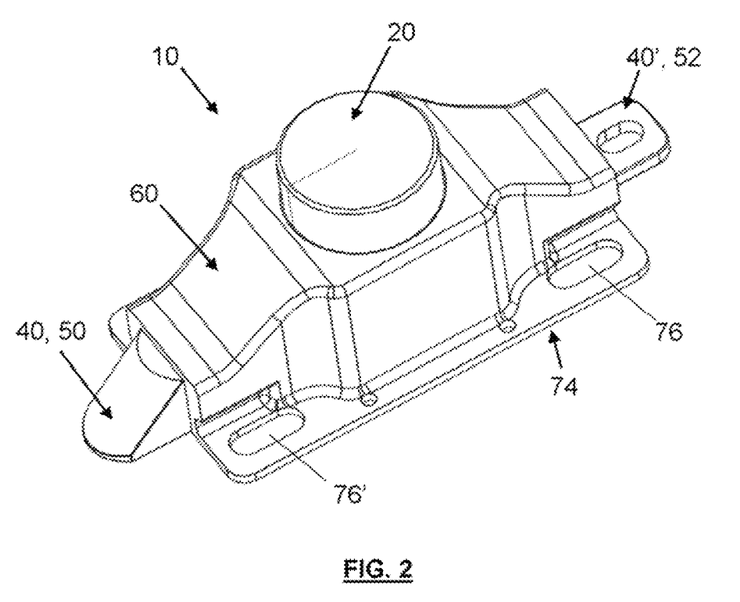
FIG. 2 is a perspective view of a latch assembly.
Figure 3:
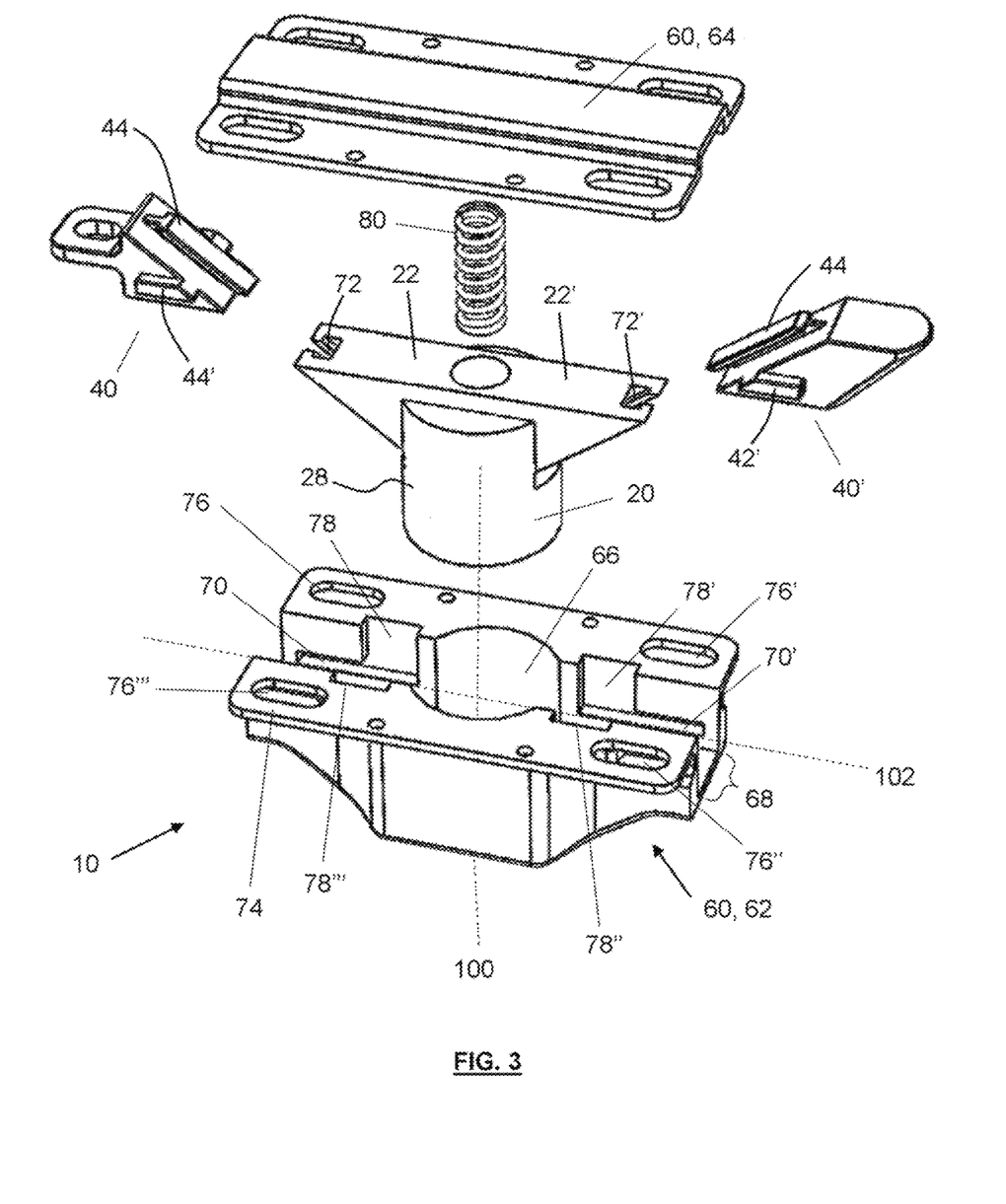
FIG. 3 is an exploded view of a latch assembly.

Referring to FIGS. 2 and 3, the latch assembly 10 comprises a button 20 and one or more sliders 40, 40'. The one or more sliders 40, 40' may be movably coupled to the button 20. During use, movement of the button 20 causes one or both of the sliders 40, 40' to move in an unlatching direction. The movement of the button 20 may be accomplished via an operator hand or finger depressing the button 20, an actuator, such as a piston/cylinder arrangement or other mechanism depressing or moving the button 20, or a spring or other biasing member 30 moving the button 20. The button 20 and/or one or both of the sliders 40, 40' may be located and supported in a housing 60. The housing 60 may comprise a first section 62 and a second section 64. The housing 60 or the second section 64 may comprise a first flange 74 and one or more openings 76, 76', 76", 76''' that are configured to accept fasteners for attaching the latch assembly 10 to the tonneau cover 12 (FIG. 1).

The slider 40 may comprise a direct latching interface 50. The direct latching interface 50 is configured to engage the latch engagement feature 16 defined in the side wall 5, 5' of the vehicle. (FIG. 1)

The slider 40' may comprise an indirect latching interface 52. The indirect latching interface 52 is configured to engage a mechanism 200, link 202 or other intermediate member, (FIG. 9) that is configured to engage with the latch engagement feature 16, illustrated in FIG. 1.

The latch assembly 10 may include a direct latching interface 50 on both sides, an indirect latching interface 52 on both sides, or one direct and one indirect latching interface 50, 52 as shown in FIG. 2.

The sliders 40, 40' are configured to engage the button 20. The sliders 40, 40' are movably coupled to the button 20. This means that one or both of the sliders 40, 40' move relative to the button 20 when the button 20 is moved. As will be discussed further below, during use, the sliders 40, 40' are configured to move relative to the button 20 in a latching direction and in an unlatching direction when the button 20 is displaced, depressed, biased, or otherwise moved. The latching direction may be when one or more of the sliders 40, 40' move away from the button 20. The unlatching direction may be when the sliders 40, 40' are moved towards the button 20.

The biasing member 80 is located and partially compressed between the button 20 and/or shoulders and the second section 64 of the housing 60. The first section 62 and the second section 64 of the housing 60 fit together to secure the button 20, the sliders 40, 40', and the spring 80 in the latch assembly 10. The first section 62 may be a top cover of the latch assembly 10 and the bottom section 64 may be a bottom cover of the latch assembly 10, or vice versa.

The housing 60 comprises a first channel 66 or recess and a second channel 68 or recess. The second channel 68 is connected to the first channel 66 and extends laterally outward from the first recess 66. The first channel 66 is configured to accept, accommodate, or receive the button 20 or a central portion 28 of button 20. During use, the button 20 can be moved or displaced along a first axis 100, which may be the same as a longitudinal axis or extension of the button 20. The second channel 68 of the housing 60 is configured to accept one or more of the shoulders 22, 22' of the button 20 and the sliders 40, 40'. The sliders 40, 40 are configured to move or slide along a second axis 102. The second axis 102 is different than the first axis 100. The second axis 102 may be generally orthogonal to the first axis 100.

One or more slots 78, 78' are formed in the housing 60, extending between a distal side of the housing 60 and housing tracks 70, 70' to allow housing engaging guides 42, 42' to pass therethrough and align within the housing tracks 70, 70'. Slots 78", 78''' also extend to housing tracks (not visible in this view).

Figure 4:
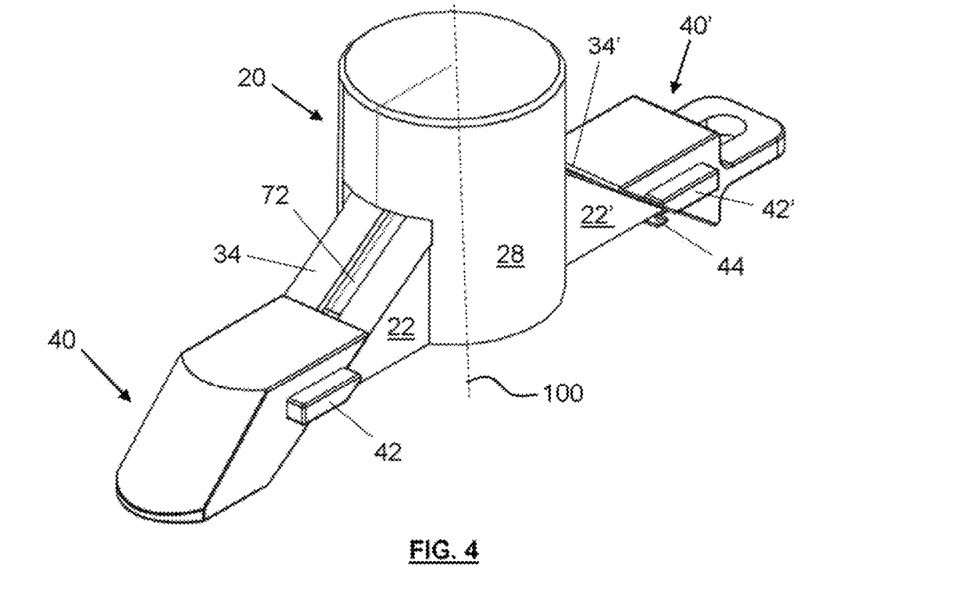
FIG. 4 is a perspective view of a button and sliders.

FIG. 4 illustrates the button 20 and sliders 40, 40'. The button 20 comprises a central portion or body 28 and one or more shoulders 22, 22'. A shoulder 22, 22' may be a projection that extends laterally away from the button 20, the central portion of the body 28 of the button 20 or a longitudinal axis of the button 20. The shoulders 22, 22' extend from opposite or opposing sides of the button 20.

The button 20 or each shoulder 22, 22' may comprise one or more grooves or shoulder tracks 72. Each slider 40, 40' comprises a projection or shoulder engaging guide 44 (FIG. 5) that is received into or configured to engage a groove corresponding track 72. The projection or shoulder engaging guides 44 form a complementary fit with the respective groove or shoulder tracks 72 so that the sliders 40, 40' are movably coupled to the button 20 or shoulders 22, 22'. In other words, the sliders 40, 40' can move or slide relative to the body 28 via the engagement of the projection or guides 44 in the groove or tracks 72 when the button 20 is moved.

One or both of the sliders 40, 40' may comprise one or more second projections or housing engaging guides 42, 42' that are configured to form a complementary fit with the housing 60 (FIG. 3). The second projections 42, 42' or housing engaging guides 42, 42' may be a pin or other projection that is configured to engage one or more corresponding grooves or housing tracks 70 (FIG. 3, 8) are also formed on both sides of the sliders 40, 40'.

Figure 5:
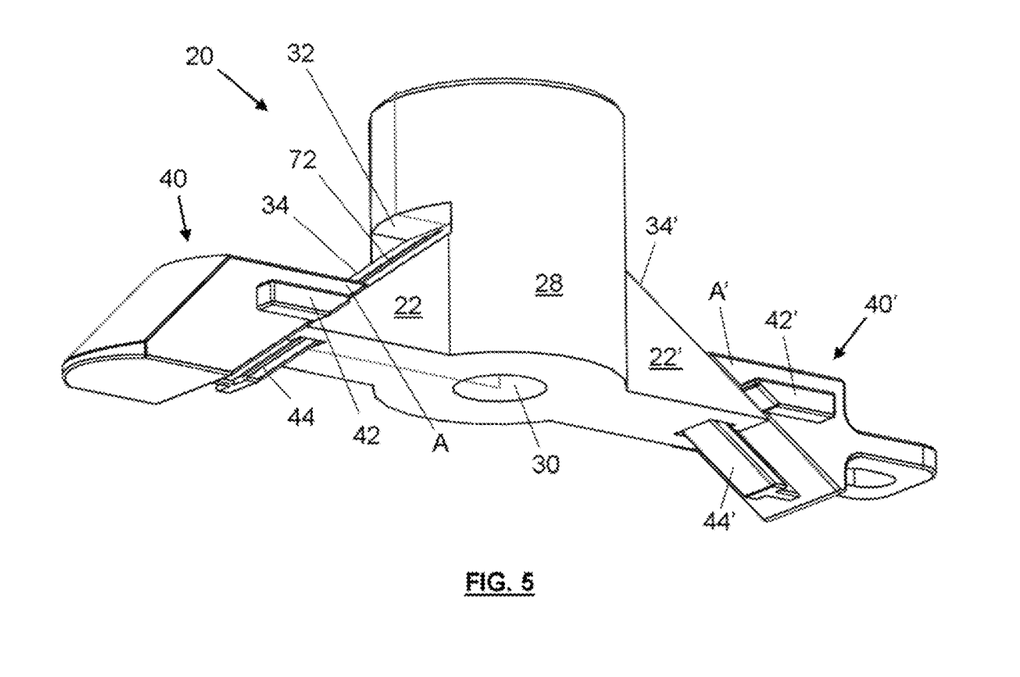
FIG. 5 is a perspective view of a button and sliders.

FIG. 5 illustrates a perspective view of a button 20 and sliders 40, 40'. The button 20 comprises a central portion or body 28, one or more shoulders 22, 22', an aperture or retaining hole 30, and recesses 32 defined in the body 28.

The retaining hole 30 extends into the button 20 and is configured to accept a biasing member 80 (FIG. 3). The spring or biasing member 80 is at least partially received into the aperture 30. The retaining hole 30 may extend all the way through a length of the button 20 or central portion 28. The retaining hole or aperture 30 may extend only partially through a length of the button 20 or central portion 28. The recesses 32 are configured to accept a portion A, A' of the sliders 40, 40'.

The sliders 40, 40' comprise one or more shoulder engaging guides 44, 44', which may also be referred to as projections or first projections. The shoulder engaging guides 44, 44' include a male feature and the shoulder tracks 72 (which may also be referred to as grooves or first grooves) are female features (or vice versa) and are configured to accept the shoulder engaging guides 44, 44'. The guides 44, 44' and corresponding tracks 72 may be T-shaped, or mushroom shaped, C-shaped, U-shaped, for example. The shoulder engaging guides 44, 44' form a complementary fit with the shoulder tracks 72 (FIG. 4) so that the sliders 40, 40' are movably coupled to the shoulders 22, 22'.

The sliders 40, 40' comprise one or more housing engaging guides 42, 42', which may also be referred to as projections or second projections, that are configured to engage or connect the housing 60 (FIG. 3) or one or more grooves (or second grooves).

Figure 6:
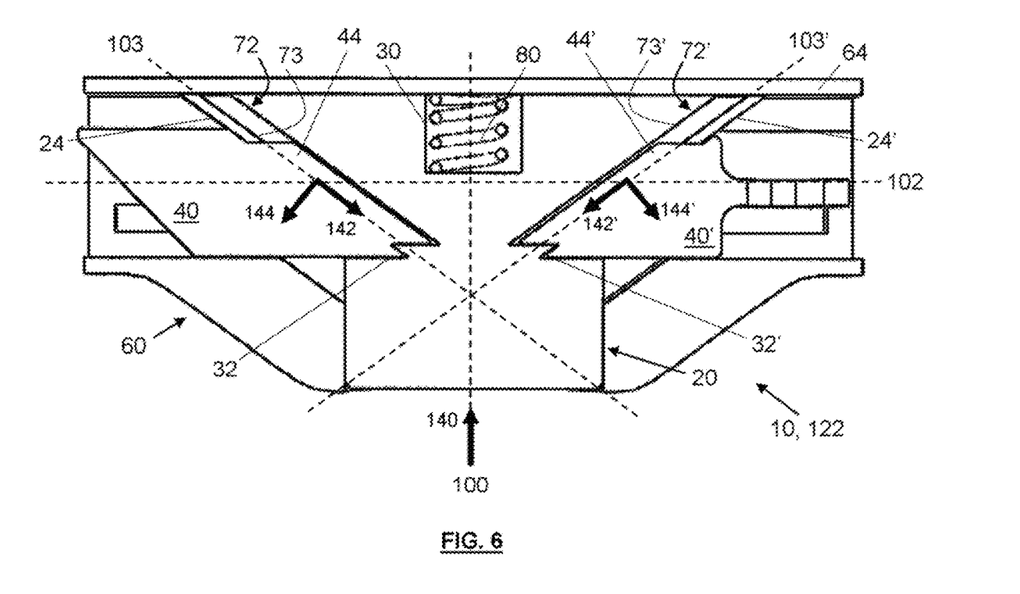
FIG. 6 is a sectional view of a latch assembly.

FIG. 6 illustrates a sectional view of a latch assembly 10 in an unlatched configuration 122. The latch assembly 10 includes two sliders 40, 40' movably engaging the button 20 by way of the projections 44, 44' engaging the slots or grooves 72, 72'. The button 20 includes shoulder tracks 72, 72' which accept shoulder engaging guides 44, 44' extending from the sliders 40, 40'. The shoulder tracks 72, 72' include inner lips 73, 73' on a surface opposing the shelves 24, 24'. A biasing member 80 is oriented within the retaining hole 30 and is braced against the second section 64 of the housing 60, between the second section 64 and the button 20.

The unlatched configuration 122 is achieved when a force 140 is applied onto the button 20, thereby moving the button 20, along a first axis 100, into the housing 60. As the button 20 is moved along the first axis 100, the biasing member 80 biases against the button 20. As the button 20 moves along the first axis 100, a force 140 is translated to the sliders 40, 40' via the contacting relationship between the sliders 40, 40' and the inner lips 73, 73'. A reciprocal force (i.e., reciprocal to the force 140) is bifurcated into first components 142, 142' and second components 144, 144'. The first components 142, 142' are oriented orthogonal to the inner lips 73, 73'. The second components 144, 144' are oriented along third axes 103, 103', which extend in-line with the inner lips 73, 73'. Since movement of the sliders 40, 40' in a direction orthogonal to the inner lips 73, 73' is restricted by the contacting relationship of the shoulder tracks 72, 72' and the shoulder engaging guides 44, 44', the sliders 40, 40' move in an unrestricted direction along the third axes 103, 103'. Movement of the sliders 40, 40' ceases when the sliders 40, 40' contact the recesses 32, 32' of the button 20.

Figure 7:
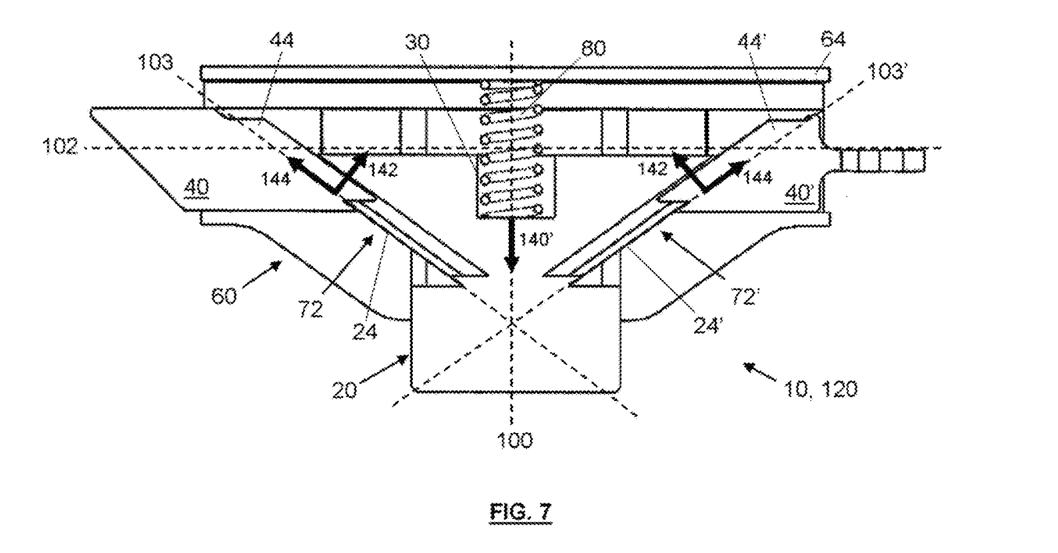
FIG. 7 is a sectional view of a latch assembly.

FIG. 8 illustrates a sectional view of a latch assembly 10 in a latched configuration 120. The latched configuration 120 is achieved when the biasing member 30 applies a force 140' (opposite force 140) onto the button 20, thereby moving the button 20, along a first axis 100, away or out of or distally from the housing 60. As the button 20 moves along the first axis 100, the force 140' is translated to the sliders 40, 40' via the contacting relationship between the sliders 40, 40' and the shelves 24, 24'. A reciprocal force (i.e., reciprocal to the force 140) is bifurcated into first components 142, 142' and second components 144, 144'. The first components 142, 142' are oriented orthogonal to the shelves 24, 24'. The second components 144, 144' are oriented along third axes 103, 103', which extend in-line with the shelves 24, 24'. Since movement of the sliders 40, 40' in a direction orthogonal to the shelves 24, 24' is restricted by the contacting relationship of the shoulder tracks 72, 72' and the shoulder engaging guides 44, 44', the sliders 40, 40' move in an unrestricted direction along the third axes 103, 103'. Movement of the sliders 40, 40' ceases when the sliders 40, 40' contact the second section 64.

Figure 8:
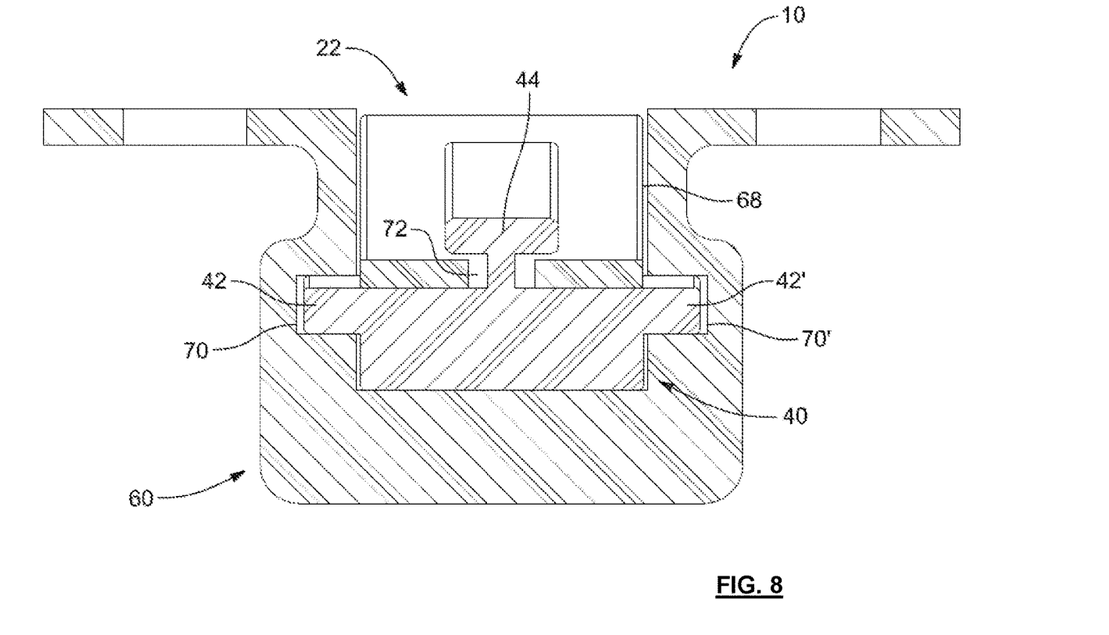
FIG. 8 is a sectional view of a latch assembly.

FIG. 8 illustrates a sectional view of a latch assembly 10. A shoulder 22 and a slider 40 are located within the second channel 68 of the housing 60. The slider 40 comprises two opposing housing engaging guides 42, 42' accepted by housing tracks 70, 70' dispensed in opposing sides of the housing 60. The slider 40 further comprises a shoulder engaging guide 44 accepted by a shoulder track 72.

Figure 9:
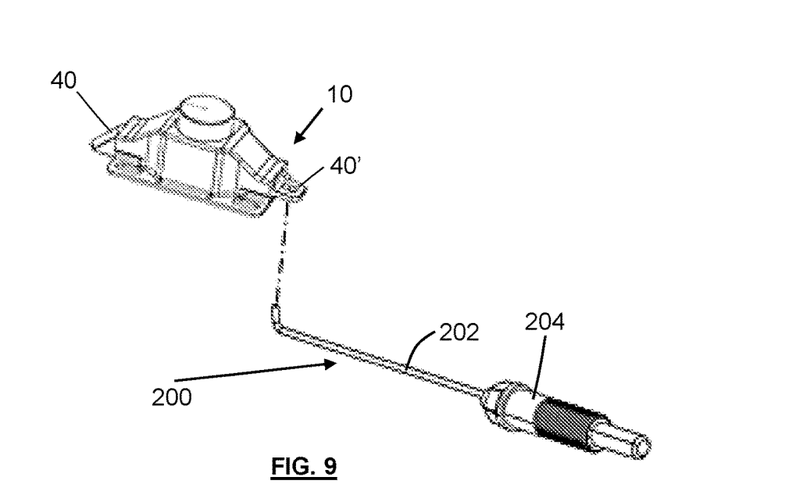
FIG. 9 is a partial exploded view of a latch assembly and a mechanism.

FIG. 9 illustrates an exploded view of a latch assembly 10 and a mechanism 200. The mechanism 200 may engage the slider 40', which is the indirect latch. This means that the slider 40' does not directly engage the latch engaging mechanism 16 in the cargo area (FIG. 1) like slider 40 may. The mechanism may include a link 202 and a latch pin 204. Movement of the slider 40', by way of movement of the button 20 described above is configured to move the mechanism 200, which causes the latch pin 204 to engage/disengage the latch engagement feature 16 in the cargo area.

It is understood that the following method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A latch assembly for a tonneau cover comprising:
    (a) a button comprising:
        a body defined by a center longitudinal axis and comprising an aperture, and
        at least one shoulder extending laterally outward from the body, the at least one shoulder having a surface acutely angled to the center longitudinal axis of the body;
    (b) at least one slider engaging the surface of the at least one shoulder and movably coupled to the button; and
    (c) a spring at least partially received into the aperture of the body;
    wherein movement of the button causes the at least one slider to slide along the surface of the at least one shoulder in an unlatching direction; and
    wherein movement of the at least one slider relative to the surface is linear and in a direction parallel to the surface.

2. The latch assembly according to claim 1, wherein a groove is defined in the at least or shoulder and the at least one slider comprises a first projection, the first projection being received into the groove; and wherein the groove and the first projection cooperate in providing lateral axial translation of the at least one slider relative to the center longitudinal axis of the body.

3. The latch assembly according to claim 2, wherein the at least one slider comprises a second projection and the latch assembly comprises a housing that includes at least one groove defined therein, the second projection being configured to engage the at least one groove in the housing; and wherein the at least one groove of the housing and the second projection cooperate in providing lateral axial translation of the at least one slider relative to the center longitudinal axis of the body.

4. The latch assembly according to claim 3, wherein the first projection and the second projection are located in different planes that are acutely angled to each other.

5. The latch assembly according to claim 1, wherein the latch assembly comprises a housing, and movement of the button into the housing causes the at least one slider to move into the unlatching direction.

6. The latch assembly according to claim 5, wherein the at least one slider moves towards the center longitudinal axis as the at least or slider is moved in the unlatching direction.

7. The latch assembly according to claim 6, wherein movement of the button away from the housing causes the at least one slider to move in a latching direction.

8. The latch assembly according to claim 7, wherein the at least one slider moves away from the center longitudinal axis as the at least one slider is moved in the latching direction.

9. The latch assembly according to claim 8, wherein the spring assists with moving the button away from the housing; and wherein the spring is compressed between the button and the housing as the at least one slider is moved in the unlatching direction.

10. The latch assembly according to claim 2, wherein at least one slider includes a pair of sliders movably coupled to the button.

11. The latch assembly according to claim 10, wherein the at least one shoulder includes a pair of shoulders extending from opposing sides of the button.

12. The latch assembly according to claim 9, wherein the housing is attached to a bottom surface of the tonneau cover.

13. The latch assembly according to claim 12, wherein the at least one slider engages a latch engagement feature defined in a wall of a vehicle.

14. The latch assembly according to claim 2, wherein the groove and the first projection are T-shaped.

15. The latch assembly according to claim 3, wherein the housing includes a slot allowing passage of the second projection into alignment with the at least one groove of the housing.

16. The latch assembly according to claim 1, wherein the body of the button comprises at least one recess that accepts a portion of the at least one slider moving toward the center longitudinal axis.

17. The latch assembly according to claim 12, wherein the housing comprises one or more openings that accept one or more fasteners for attaching the latch assembly to the tonneau cover.

18. A latch assembly for a tonneau cover comprising:
(a) a button comprising:
 a body defined by a center longitudinal axis and comprising an aperture, and
 a shoulder extending laterally outward from the body, the shoulder having a surface acutely angled to the center longitudinal axis of the body;
(b) a slider engaging the surface of the shoulder and movably coupled the button;
(c) a housing; and
(d) a spring being at least partially received into the aperture;
wherein movement of the button into the housing causes the slider to slide along the surface of the shoulder, toward the center longitudinal axis of the body, in an unlatching direction;
wherein movement of the slider relative to the surface is linear and in a direction parallel to the surface; and
wherein the spring is compressed between the button and the housing as the slider is moved in the unlatching direction.

19. The latch assembly according to claim 18, wherein a groove is defined in the shoulder and the slider comprises a first projection, the first projection being received into the groove;
wherein the groove and the first projection cooperate in providing lateral axial translation of the slider relative to the center longitudinal axis of the body;
wherein the slider comprises a second projection and the housing comprises a groove defined therein, and the second projection engages the groove in the housing;
wherein the groove of the housing and the second projection cooperate in providing lateral axial translation of the slider relative to the center longitudinal axis of the button; and
wherein the first projection and the second projection are located in different planes that are acutely angled to each other.

20. The latch assembly according to claim 17, wherein the one or more openings are located on a flanged portion of the housing.

* * * * *